(12) United States Patent
Hake (10) Patent No.: US 10,639,557 B2
(45) Date of Patent: May 5, 2020

(54) SYNCHRONIZED MOTION SIMULATION FOR VIRTUAL REALITY

(71) Applicant: JNTVR LLC, Manhattan, KS (US)

(72) Inventor: Jeffrey Scott Hake, Wamego, KS (US)

(73) Assignee: JNTVR LLC, Manhattan, KS (US)

( * ) Notice: Subject to any disclaimer, the term of this patent is extended or adjusted under 35 U.S.C. 154(b) by 0 days.

(21) Appl. No.: 16/014,437

(22) Filed: Jun. 21, 2018

(65) Prior Publication Data

US 2018/0369702 A1 Dec. 27, 2018

Related U.S. Application Data

(60) Provisional application No. 62/523,351, filed on Jun. 22, 2017.

(51) Int. Cl.
| | |
|---|---|
| *A63G 31/02* | (2006.01) |
| *A63G 31/16* | (2006.01) |
| *G06F 3/01* | (2006.01) |
| *A63G 25/00* | (2006.01) |
| *G02B 27/01* | (2006.01) |
| *G06T 19/00* | (2011.01) |

(52) U.S. Cl.
CPC ............. *A63G 31/16* (2013.01); *A63G 25/00* (2013.01); *A63G 31/02* (2013.01); *G02B 27/017* (2013.01); *G06F 3/012* (2013.01); *G06F 3/013* (2013.01); *G06T 19/006* (2013.01)

(58) Field of Classification Search
CPC .......... G63G 31/02; G63G 31/16; G63G 7/00; G63G 31/00; G02B 2027/0178; G02B 2027/0141; G02B 2027/0145; G02B 27/017; G06F 3/011; G06F 3/012; G06F 3/013; G06F 3/04815; G06T 19/006; G06T 2219/024; A63F 13/211; A63F 13/213; A63F 13/245; A63F 13/25; A63F 13/26; A63F 13/30; A63F 13/355; A63F 13/5255; A63F 13/843; A63F 2300/6653
See application file for complete search history.

(56) References Cited

U.S. PATENT DOCUMENTS 6,220,965 B1 * 4/2001 Hanna ...................... A63G 7/00
                                                                463/52
2011/0273451 A1 * 11/2011 Salemann ............... G06T 15/20
                                                                345/427

(Continued)

*Primary Examiner* — Jin Cheng Wang
(74) *Attorney, Agent, or Firm* — Erise IP, P.A.

(57) ABSTRACT

Embodiments of the invention provide for a motion-synchronized virtual reality experience. In particular, in some embodiments, the invention includes a motion platform to impart a shared motion experience to a plurality of passengers, individual head-mounted displays providing for personalized viewpoints, and a variety of immersion-enhancements. A common ride model to controls the motion platform in order to simulate a ride for a plurality of passengers. The passengers' virtual-reality headsets depict the progress of the ride through the virtual-reality world. These headsets track the individual passenger's head or gaze to allow the user to adjust their angle of view in the virtual world simply by looking around. As such, different passengers can be looking in different directions simultaneously, allowing a much greater immersion than the single fixed perspective of prior ride simulations.

20 Claims, 4 Drawing Sheets

(56) References Cited

U.S. PATENT DOCUMENTS

| | | | |
|---|---|---|---|
| 2015/0109338 A1* | 4/2015 | McKinnon | G06F 16/5866 345/633 |
| 2015/0269780 A1* | 9/2015 | Herman | G06T 13/00 345/633 |
| 2015/0294505 A1* | 10/2015 | Atsmon | G06T 19/006 345/633 |
| 2015/0336012 A1* | 11/2015 | Maycock | G05D 1/0022 701/2 |
| 2015/0381927 A1* | 12/2015 | Mourning | G06T 17/05 386/328 |
| 2016/0048203 A1* | 2/2016 | Blum | G06F 3/012 104/84 |
| 2016/0260252 A1* | 9/2016 | Kim | G06T 19/003 |
| 2017/0025031 A1* | 1/2017 | Dreyer | G09B 9/12 |
| 2018/0089901 A1* | 3/2018 | Rober | G06F 3/011 |
| 2018/0253905 A1* | 9/2018 | McCracken | G06F 3/011 |
| 2018/0255285 A1* | 9/2018 | Hall | A63G 27/00 |
| 2018/0357233 A1* | 12/2018 | Daze | H04L 67/36 |

* cited by examiner

SYNCHRONIZED MOTION SIMULATION FOR VIRTUAL REALITY

RELATED APPLICATION

This non-provisional patent application claims priority benefit, with regard to all common subject matter, of earlier-filed U.S. Provisional Patent Application No. 62/523,351 filed Jun. 22, 2017 and entitled SYNCHRONIZED MOTION SIMULATION FOR VIRTUAL REALITY. The identified earlier-filed provisional patent application is hereby incorporated by reference in its entirety into the present application.

BACKGROUND

1. Field

Embodiments of the invention generally relate to virtual reality and, more particularly, to virtual reality rides with synchronized motion and individualized virtual viewpoints for each passenger.

2. Related Art

Traditionally, motion simulated rides have, of necessity, been limited to presenting a single, shared viewpoint for all passengers. Typically, a screen is placed at the front of a motion platform and all passengers are oriented to face towards the screen, which presents a single video perspective to which the motion platform can be synchronized. However, this greatly limits the passengers' perspectives.

By contrast, virtual reality systems have typically been limited to single-user, fixed installations due to the inherent difficulty in synchronizing the displays for multiple uses, the lack of uniformity in content display and presentation, and the inherently isolating experience of wearing a head-mounted virtual reality display. As such, what is needed is a system that can provide a synchronized, shared ride experience to a group of passengers with the enhanced immersion provided by synchronized motion simulation. Immersion can further be improved through the additional enhancements made possibly in a ride environment, such as high-fidelity shared audio, rumble-enabled seats, and shared atmospheric effects.

SUMMARY

Embodiments of the invention address the above-described need by providing for a motion-synchronized virtual reality experience. In particular, in a first embodiment, a system for providing a motion-synchronized virtual reality ride for a plurality of passengers, comprises a motion platform supported by a plurality of actuators, a plurality of passenger seats mounted upon the motion platform, a plurality of passenger head-mounted displays, and a ride model programmed to control the plurality of actuators in accordance with the ride model, and communicate information regarding progress of the ride to each of the passenger head-mounted displays, wherein each of the passenger head-mounted displays combine the information regarding progress of the ride with passenger gaze information to display a personalized viewpoint for each passenger of the plurality of passengers.

In a second embodiment, a system for providing a motion-synchronized virtual-reality ride for a plurality of passengers comprises a plurality of motion platforms, each platform supported by a plurality of actuators, wherein each motion platform of the plurality of motion platforms comprises at least one seat mounted thereon, a plurality of passenger head-mounted displays; and a ride model programmed to control the plurality of actuators for each of the plurality of motion platforms in accordance with the ride model, and communicate information regarding progress of the ride to the plurality of passenger head-mounted displays, wherein each of the plurality of passenger head-mounted displays combine the information regarding the progress of the ride with passenger gaze information to display a personalized viewpoint for each passenger of the plurality of passengers.

In a third embodiment, a system for providing a motion-synchronized virtual-reality ride for at least one passenger comprises at least one motion platform supported by a plurality of actuators, wherein the at least one motion platform comprises at least one seat, at least one passenger head-mounted display, at least one ride control configured for a user input, and a ride model programmed to receive information indicative of a state of a drone, control the plurality of actuators in accordance with the ride model and the ride control, wherein the ride model includes of a set of characteristics associated with the drone, control the at least one motion platform in accordance with the information indicative of the state of the drone, the ride model, and the user input, and communicate information regarding progress of the ride to the at least one passenger head-mounted display, wherein the at least one passenger head-mounted display combines the information regarding the progress of the ride with passenger gaze information to display a personalized viewpoint for the at least one passenger.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

At a high level, embodiments of the invention use a common ride model to control a motion platform simulating a ride for a plurality of passengers. The passengers are equipped with virtual-reality headsets that depict the progress of the ride through the virtual-reality world. These headsets may be equipped with head-tracking or gaze-tracking features to allow the user to adjust their angle of view in the virtual world simply by looking around. As such, different passengers can be looking in different directions simultaneously, allowing a much greater immersion than the single fixed perspective of prior ride simulations.

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Figure 1:
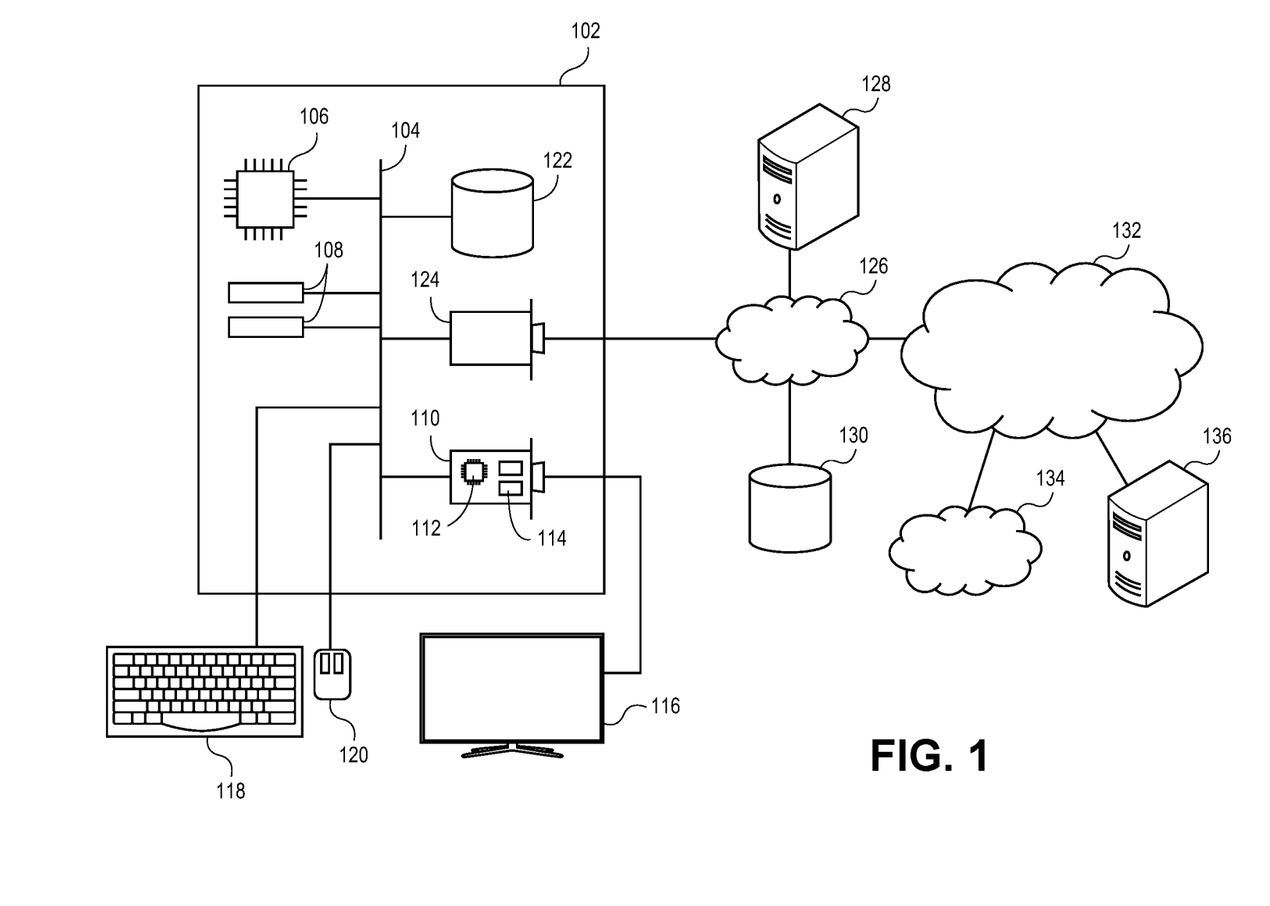
FIG. 1 depicts an exemplary hardware platform for certain embodiments of the invention.

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules. Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removeably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
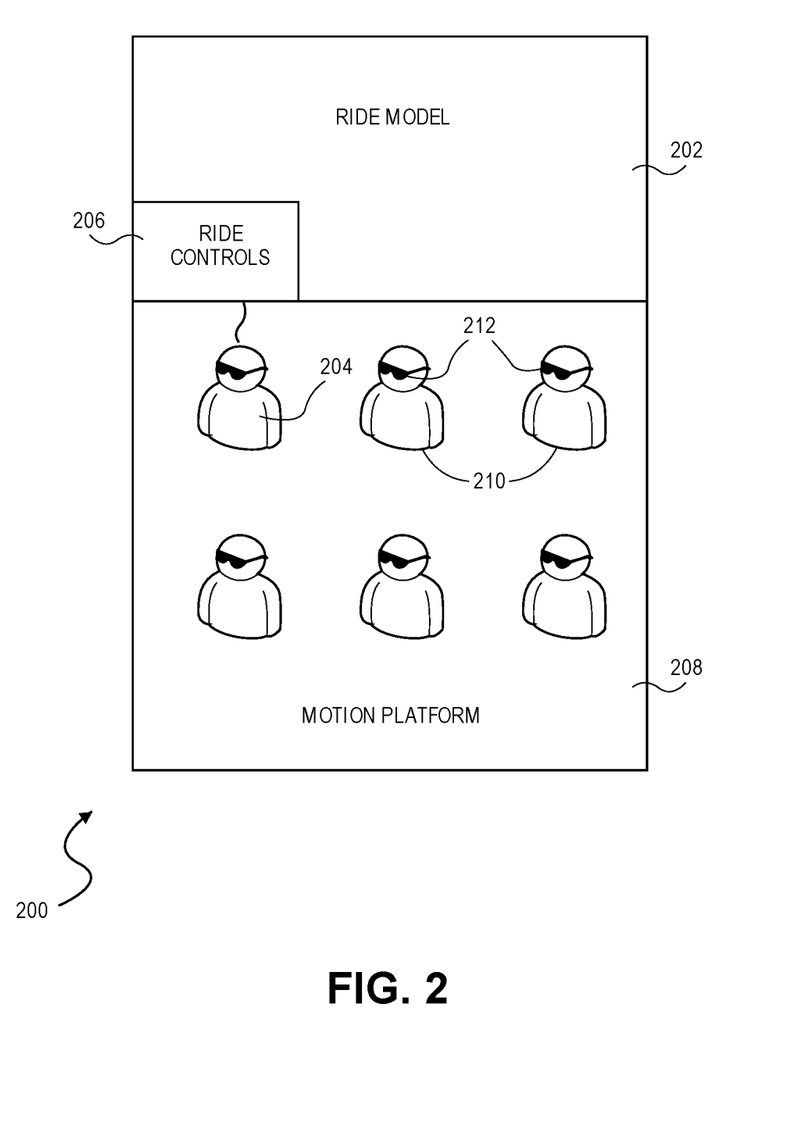
FIG. 2 depicts a block diagram illustrating certain components for use in some embodiments of the invention.

Turning now to FIG. 2, a block diagram illustrating certain components making up one embodiment of the invention is depicted and referred to generally by reference numeral 200. A first component present in such embodiments is ride model 202. A driver 204 may use ride controls 206 to communicate with the ride model 202. The driver 204 may be riding on a ride in which the ride model uses actuators to move a motion platform 208 with passengers 210. The diver 204 and passengers 210 may also wear head-mounted displays 212 that present images to the driver 204 and passengers 210 to further immerse the users into the virtual reality.

Broadly speaking, ride model 202 contains the information used to generate the digital model of the ride. For example, if the ride is a simulated roller coaster, then ride model 202 would contain information describing the shape of the track, the physics of the roller coaster, the background scenery, and so forth. If the ride is a free-path simulated trip through a virtual world, ride model 202 may contain a three-dimensional model of the virtual world, capabilities of the virtual vehicle, models and behaviors for virtual actors in the virtual world, and so forth. In some embodiments, ride model 202 further controls the ride during operation by modeling the virtual objects in the virtual world and their interactions. For example, in an adventure ride where the passengers 210 can shoot simulated monsters, ride model 202 may be responsible for controlling the behaviors of the monsters, tracking where the passengers 210 are aiming, determining whether a shot hits a monster and modeling the result, and so forth. Further, ride model 202 may incorporate information from remote data sources. For example, the ride model 202 may receive data from an unmanned vehicle (not shown) such as, for example, video from a camera, motion, and orientation information. The ride model 202 may incorporate this information into a dynamic model of the unmanned vehicle and present a simulation to the passengers 210 of the ride. The dynamic model of the unmanned vehicle may be a set of characteristics or parameters that define the motion and orientation of the unmanned vehicle when commanded and uncommanded inputs act on the unmanned vehicle.

In the creation of the virtual world, the ride model 202 may also add in representatives of the passengers 210 of the ride. For example, the passengers 210 may be imaged before riding. The image information may be processed and the processor may be programmed to create a representative figure in the virtual world. The representative figure may be dependent on the type of ride. For example, in the monster shooting ride described above, a photograph of a driver 204 may be taken and the image used to create a representative image of the driver 204 that may be a realistic image or may be a virtual representation such as, for example, a type of superhero or military figure. The driver 204 may also be given options of characters or representations to use during the ride or outfits for the driver representatives to be dressed in.

In some embodiments, the progress of the ride may be controlled by a dedicated passenger such as driver 204 using ride controls 206. Ride controls 206 may include a physical or virtual control interface operable by driver 204 and communicate with ride model 202. For example, if the ride is an African safari, then driver 204 may be provided with a steering wheel and set of pedals to control where a safari vehicle goes. In some embodiments, these controls may be virtualized. For example, motion-tracking software can track the hands of driver 204 as they operate a purely virtual steering wheel shown in a head-mounted display. In still other embodiments, a conventional gaming controller (such as a joystick or gamepad) can be used to control the progress of the ride. In some embodiments, ride controls 206 are instead operated by a dedicated ride operator rather than a passenger. In other embodiments, more than one passenger is provided with ride controls 206. In still other embodiments, the ride controls may be operated by a remote vehicle such as an autonomous vehicle with a predefined or adaptable trajectory. The ride model 204 may receive information from the autonomous vehicle to provide a simulation to the driver 204. The path of the vehicle may also be altered by the driver 204 such that the ride model 202 uses a combination of the driver input via the ride controls 206 and the autonomous vehicle telemetry information to provide a simulation to the driver 204.

In some embodiments, ride model 202 and ride controls 206 communicate to jointly control motion platform 208. Broadly speaking, motion platform 208 provides high-fidelity motion simulation for passengers 210 and/or driver 204. For example, passengers 210 may be seated in chairs that are attached to a platform that is in turn supported by a plurality of hydraulic actuators. By appropriately activating the hydraulic actuators, the platform upon which passengers 210 are seated can be raised, lowered, and tilted. In some embodiments, motion platform 208 may also be mounted on a turn table or otherwise allow rotations of the platform. One, two, or three turn tables may be used in combination to provide rotation about any axis.

In still other embodiments, the motion platform 208 or individual passenger seats may be mounted on three-axis gimbal system to allow free three-dimensional rotation on any axis. Such gimbal systems can be used alone or in combination with hydraulic actuators to provide for the broadest ranges of motion. The gimbal system can also be in combination with a boom that may provide translation in any three-dimensional direction. The gimbal system may also be attached to a track or rails to provide translational motion to the motion platform 208.

In some embodiments, the seats for passengers 210 are provided with individual tilt controls alone or in combination with those for motion platform 208. The combination of actuators controlling all seats and actuators controlling individual seats allows the ride model 202 and the passengers 210 to provide both combined experiences for all passengers 210 and individual experiences to the ride.

Additionally, each passenger 210 may be provided with a head-mounted display 212 providing a personalized view of the virtual world. Such head-mounted displays can track the motion of the user's head and update their display in accordance with the motions of the user and also with the ride. Returning to the above-described example of a virtual roller coaster, the joint operation of ride model 202, motion platform 208, and head-mounted display 212 can be described. When ride model 202 determines that the virtual ride begins, the virtual cars of the roller coaster ascend the first lift hill. Because the roller-coaster cars are parallel to the tracks at any given point in the ride, ride model 202 determines that motion platform 208 should tilt the platform upon which passengers 210 are seated by raising the front side and lowering the rear side. As such, hydraulic actuators at the front of platform extend and hydraulic actuations at the rear of the platform collapse to tilt the platform appropriately. Simultaneously, ride model 202 communicates this tilt to the head mounted displays. Causing the viewing angle of the simulated display to rise towards the skies. In other embodiments, the head-mounted displays 212 have orientation sensors and transmit orientation and motion information to the ride model 202 that in turn projects the rise toward the sky based on the information from the head-mounted displays 212. In some embodiments, head-mounted displays 212 are opaque, displaying only the simulated environment. In other embodiments, head-mounted displays 212 are partially transparent augmented reality displays, overlaying a display on the user's actual field of view.

In some embodiments, the motion platform 208 may move along a track. In this case, the platform may be on a turntable as described above. The motion platform 208 may be programmed to rotate on the turntable at specific times during the course of the ride. For example, the ride may be the roller coaster described above and traversing a jungle scene as presented via the head-mounted displays 212. The roller coaster goes down a hill and the virtual reality image shows a scene of the passengers going under water. The motion platform 208 rotates to face a shark in the water. The rotation of the motion platform 208 faces the passengers 212 in a direction where an event is taking place, however, the passengers are wearing the head-mounted displays 212 and still have the freedom to look in any direction providing a personalized experience.

In some embodiments, ride model 202 communicates a change to the head-mounted displays 212 directly. In other embodiments, head-mounted displays 212 include gyroscopes and/or accelerometers to determine that the passenger's head has moved with the motion platform 208 and update the view based on the change in orientation of the passenger's head. In still other embodiments, both of these techniques may be used. For example, the head-mounted displays 212 may measure the movement of the user's head with respect to the motion platform 208, and display changes not reflected in the orientation of the motion platform 208 (for example, rotations) can be communicated directly to the head-mounted displays 212. Thus, for example, if a simulated roller coaster executes a banking turn to the right, motion platform 208 may tilt in the appropriate direction (i.e., to the right), while ride model 202 instructs head-mounted displays 212 to rotate the perspectives of passengers 210 accordingly.

Importantly, however, the individual viewpoints of each passenger can also be respected. Thus, for example, one passenger is looking to their left as the roller-coaster executes the above described turn, their head-mounted display would initially show a leftward view (with respect to the roller-coaster car), which would swing right through the turn, eventually facing the original direction of travel of the rollercoaster as the turn continues. Thus, in this example, the current direction of travel of the virtual roller-coaster car would set the base direction of the viewpoint for all passengers 210, which could then be adjusted based on the orientation of each passenger's head relative to the platform. In this way, the passengers 210 can enjoy a joint ride without being restricted to the single viewpoint of a fixed screen.

In order to further increase user immersion, a variety of additional effects may be integrated into motion platform 208. For example, the seat for each passenger 210 may integrate a rumble unit to simulate the vibration of a ride. In some embodiments, each passenger gets the same rumble, while in other embodiments, the rumble for each passenger is determined by their position on motion platform 208, the user's point of view, or other factors specific to a particular passenger. Other immersion features, such as fans to provide simulated wind and fog or mist machines may also be included and synchronized into the simulation. Audio effects may also be provided based on the ride model 202. For example, a ride may simulate going through a waterfall causing water to be dropped or sprayed from an overhead system controlled by the ride model 202. The ride may travel through a burning building, causing heat to be provided from a heater and fan next to the motion platform 208 while sound effects representing the sound of fire are crackling from speakers on the motion platform 208, mounted strategically throughout the ride, or through headphones worn by the passengers 210. Any combination of real effects mixed with virtual reality is contemplated.

Figure 3:
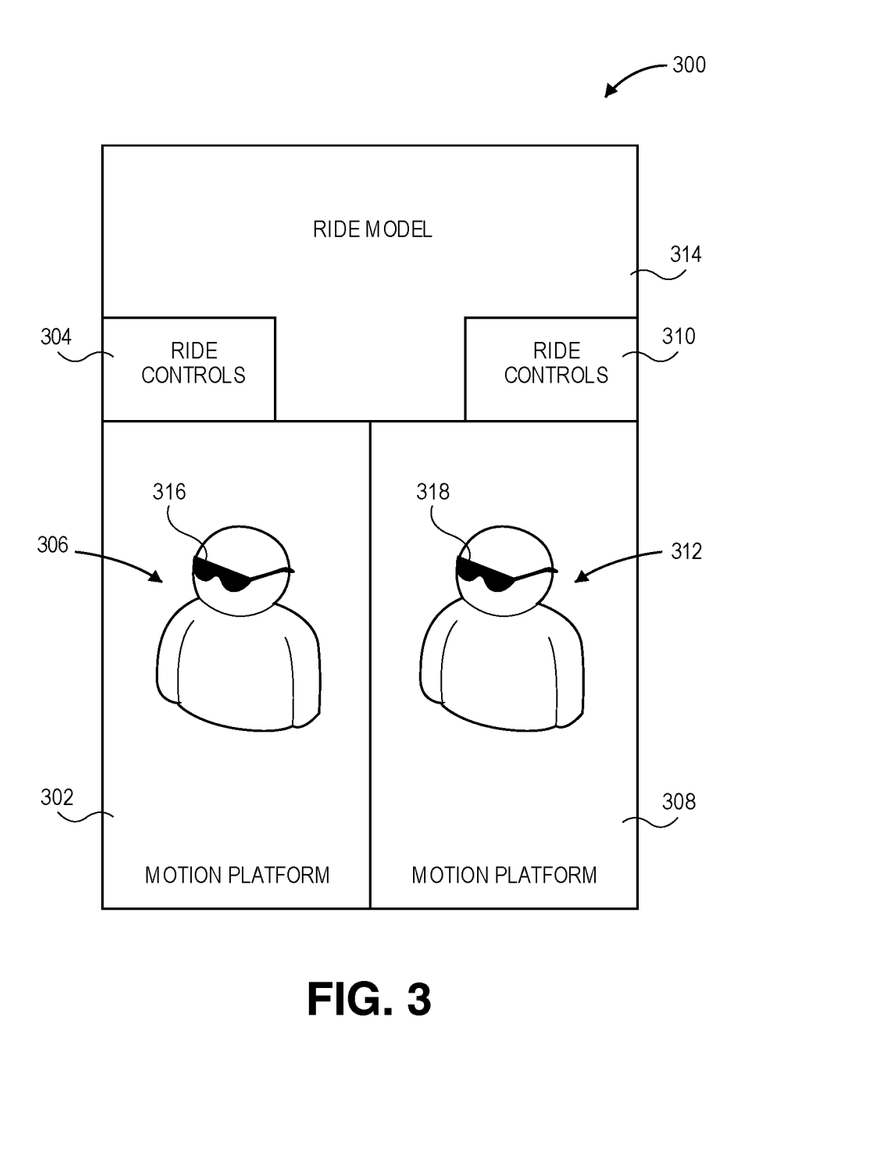
FIG. 3 depicts a block diagram illustrating certain components for use in some embodiments of the invention.

Turning now to FIG. 3, a second exemplary embodiment of a motion-synchronized virtual reality ride is depicted and referred to generally by reference numeral 300. The motion-synchronized virtual reality ride, as depicted, consists of driver motion platform 302 including driver ride controls 304 and driver 306, and passenger motion platform 308 including passenger ride controls 310 and passenger 312. The driver motion platform 302 and driver ride controls 304 are connected to the ride model 314 as are passenger motion platform 308 and passenger ride controls 310. Driver 306 and passenger 312 are seated in driver motion platform 302 and passenger motion platform 308 respectively. Driver 306 is wearing driver head-mounted display 316 and passenger 308 is wearing passenger head-mounted display 318.

In some embodiments, driver motion platform 302 and passenger motion platform 308 includes actuators and controls that move driver motion platform 302 and passenger motion platform 308 independently. When driver 306 provides input to the driver ride controls 304, driver motion platform 302 may be actuated in response to the input and passenger motion platform 308 may not receive the input. However, a representation of driver motion platform 302 with driver 306 may be depicted in the passenger head-mounted display 318 of passenger 312 and the depiction may move relative to the inputs of driver 306. Motions of the driver 306 may also be recorded by motion detecting cameras and sent to the ride model 202 and processed and depicted in the passenger head-mounted display 318.

The ride model 314 may connect to the driver motion platform 302 and the passenger motion platform 308 such that representative models of the driver motion platform 302 and the passenger motion platform 308 and the driver 306 and the passenger 312 are displayed in the head-mounted displays. Any movement of the driver motion platform 302 and the passenger motion platform 308 caused by inputs from the passengers, a person running the ride, or provided by the ride model 314 may be depicted in the head-mounted displays. This creates a unique experience for each driver 306 and passenger 312 that has a combination of sensory experiences that both diver 306 and passenger 312 experience and individual sensory experiences that each experience independently.

In some embodiments, driver 306 and passenger 312 may be playing a game using their respective motion platforms connected to the ride model 314. Driver 306 and passenger 312 may be connected to the ride model 314 and both may experience the same game or same environment but acting independently. For example, driver 306 may be operating the driver ride controls 304 and flying a spaceship, aircraft, boat, or any other vehicle as simulated by the ride model 314 and viewed through the head-mounted displays 316. Passenger 312 may be a gunner on the vehicle and acting independently. The seat that the gunner (passenger 312) is in moves relative to the inputs of the controls of the passenger 312 while both driver 306 and passenger 312 seats move relative to the actions and inputs of driver 306. In this case, the seat of passenger 312 moves in accordance with the motion of the vehicle that driver 306 is controlling as well as the motion that passenger 312 is controlling. This creates a joint objective but independent gaming experience.

Alternatively, in some embodiments, both or each of the driver motion platform 302 and the passenger motion platform 308 may be controlled by a person not on the ride 300. For example, the ride 300 may be run by a venue employee and the driver 306 and the passenger 312 may not have control or may have limited control. For example, the ride 300 may be a safari ride in which the driver 306 and the passenger 312 are taken on an African safari. An African landscape and animals are viewed through the driver head-mounted display 316 and the passenger head-mounted display 312. The African surroundings may be viewed by the driver 306 and the passenger 312 looking to either side to see different surroundings. The head-mounted displays have sensors that detect motion and orientation and transmit the information to the ride model 314. The ride model 314 then displays the images associated with the orientation of the head-mounted displays. The venue employee may conduct the ride and navigate the African terrain while explaining the different sights and sounds of the safari to the driver 306 and the passenger 312.

The driver 306 and the passenger 312 may provide input to the head-mounted displays to further control the ride. Continuing with the African safari example described above, the driver 306 may see a lion in the distance, which is too far away to see with clarity. The driver 306 may provide user input to the driver head-mounted display 316 such as through a button, switch, knob, or any other input causing the display to zoom in on the animals, simulating the effect of binoculars. The driver head-mounted display 316 continues to display images associated with the driver's gaze but with a zooming effect.

In yet another example the ride model 314 may be remotely connected to or in communication with a vehicle and simulate the motion and orientation of the vehicle while displaying the vehicle environment or a virtual environment. For example, the ride model 314 may communicate wirelessly with an unmanned system such as a land vehicle, a submarine, or an unmanned aerial vehicle (UAV), (collectively, "drones"). The UAV may be controlled by a pilot outside of the motion platforms, a ride director, the driver 306, or the passenger 318 and either connected or not connected to the ride model 314. The UAV may have a camera attached and a transmitter that transmits the video captured to the ride model 314 along with telemetry data of the UAV. The ride model 314 may use the telemetry data to simulate the actions of the UAV on the driver motion platform 302 and the passenger motion platform 308. The video data may be used by the ride model 314 and the head-mounted displays to show the video scene associated with the orientation of the head-mounted displays. In certain embodiments, the video data from the UAV may also be sent directly to the head-mounted displays. The UAV can have sensors onboard such as a gyroscope, accelerometer, GPS, air pressure sensor, or any other sensors that may record telemetry information such as motion and orientation information of the UAV. The telemetry information may be received in real-time or stored and later recalled for use in ride 300. The telemetry information may be sent to the ride model 314 and a visual representation of the UAV may be displayed via the head-mounted displays. The driver 306 and the passenger 312 may also view the images from the camera or a simulated virtual reality. The driver 306 and the passenger 312 may also provide input via the ride controls that control the UAV and simultaneously control the ride while viewing input from the camera on the UAV via the head-mounted displays and feeling a representative motion of the UAV via the motion platforms. The simulation of the UAV may be performed by a three, six, or any other degree of freedom dynamic model of the UAV and incorporate the telemetry information for a realistic simulation. The ride model 314 may have a stored database of aircraft and UAV dynamic models or may access an online database for simulation of the aircraft and UAVs. For example, the driver 316 flies a quadcopter style UAV, or drone, through an obstacle course in a race against other drones controlled by other users. The drone has a camera and sensors recording and transmitting telemetry data to the ride model 314. The driver motion platform 308 moves according to the telemetry data such that all driver inputs are actuated as well as uncommanded inputs. Uncommanded inputs may be wind gusts, bumps from other drones, collisions with obstacles, or any other input to the drone that is not commanded by the driver 306. The passenger 312 may be another drone operator in the same race and may be connected to ride model 314 such that all drones in the race utilize the same ride model 314. In some embodiments, the driver 306 and the passenger 312 connect to the drones through different ride models that are not connected.

Figure 4A:
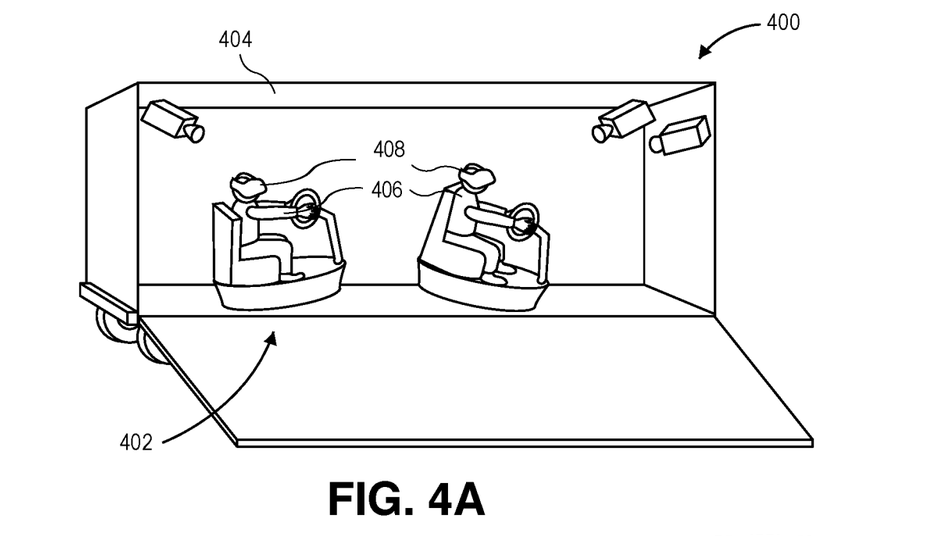
FIGS. 4A-C depict embodiments of a mobile platform.
Figure 4B:
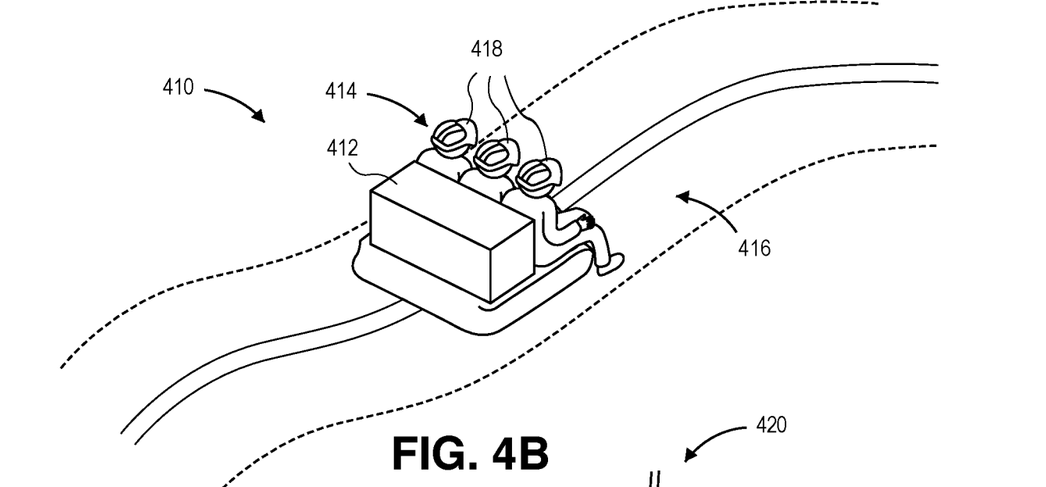
Figure 4C:
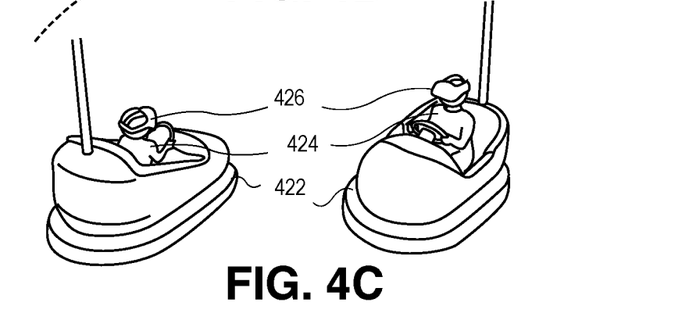

Turning now to FIGS. 4A-C depicting exemplary embodiments of a mobile motion platform. The motion platform may be self-powered or may ride on a mobile device providing a mobile platform that may be relocated as desired. In this manner, the motion platform may move from location to location to different events quickly and easily. The mobile motion platform may also provide new and exciting experiences for the passengers.

FIG. 4A depicts and exemplary embodiment of a mobile motion platform generally referred to by reference numeral 400. As depicted a motion platform 402 is mounted in a trailer 404 such that the motion platform 402 may be moved from location to location. The motion platform 402 has independent seats for multiple passengers 406 wearing head-mounted displays 408. For example, motion platform 402 may be mounted inside the trailer 404 and the trailer 404 may be attached to a vehicle (not shown). In some such embodiments, motion platform 402 moves relative to (i.e., independently of) the trailer 404. In other embodiments, motion platform 402 utilizes the suspension of the trailer 404 to provide a tilting motion. In still other embodiments, motion platform 402 provides for a "stowed" configuration where it fits compactly inside the trailer, and a "deployed" configuration, where motion platform 402 is supported independently from the trailer 404 (for example, by deployable struts) which provide for the tilting and/or other motions of motion platform 402. Further, motion platform 402 may be capable of both translation and rotation within the trailer 404.

In some embodiments, the motion platform 402 may be one integrated platform supporting multiple passengers 406 using one ride model or there may be multiple independent motion platforms each with separate ride models supporting multiple passengers 406.

The trailer 404 may be taken to a manned or unmanned airshow such as the Red Bull Air Race World Championships where telemetry information from a manned vehicles flying through an obstacle course may be transmitted to the ride model controlling the movement of the motion platforms 402 in the trailer 404. The head-mounted displays 408 may display information from cameras onboard the aircraft and the telemetry data from the aircraft may be fed through an aircraft simulation model provided by the ride model such that the motion platforms 402 move in accordance with the aircraft to provide a realistic experience to the passengers 406. In this way spectators at the airshow may experience what the pilot is experiencing in the aircraft. Similarly, the trailer 404 may be taken to model aircraft show. Data may be taken from unmanned aircraft and displayed via the head-mounted displays and through the motion platform such that the passengers 406 may experience similar motion of the unmanned aircraft. The ride model and ride controls in the trailer 404 may also be used to control the unmanned aircraft. The ride model may contain or may access an online database of aircraft dynamic model representations for three or six degree-of-freedom simulations.

FIG. 4B depicts an exemplary embodiment of a ride generally referred to by reference numeral 410 including a motion platform 412 seating multiple passengers 414 and traversing a track or rail system 416. The motion platform 410 may be moving along a preset and timed path in communication with and controlled by a ride model. The ride model may present information to the head-mounted displays 418 and the head-mounted displays 418 may also communicate orientation, gyroscopic, and acceleration information to the motion platform 412 and the ride model. The motion platform 412 may also provide the passengers 414 with controls such that the passengers 414 may provide input. For example, the ride may be a roller coaster with stops and questions provided throughout the experience, and which the ride continues based on the answers to the questions. The ride may continue along different paths in a choose-your-own-adventure manner or the controls may be handed to the passenger that answered a question correctly and the quickest. This may block some passengers from controlling the ride and switch between different controls presented to the passengers 418.

FIG. 4C depicts an exemplary embodiment of a ride generally referred to by reference numeral 420 including multiple motion platforms 422 controlled independently but providing imagery of the same environment to multiple passengers 424. As depicted the passengers 424 are engaged in a game of bumper cars where the motion platforms 422 are cars. The cars may run as normal bumper cars and the imagery of the bumper cars environment may be provided by head-mounted displays 426. This may provide the passengers 424 with an experience beyond the normal bumper cars game. For example, the passengers 424 may view all passengers participating in the game via the head-mounted displays. The location and motion may be provided by wireless communication through a central ride model. The ride model may also provide the riders with extra games such as soccer or hockey using a virtual ball or puck and virtual goals through the head-mounted displays 426. The ride model may also provide a virtual team playing against the passengers 424 or each passenger may be on a different team and is playing alongside virtual teammates.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system for providing a motion-synchronized virtual reality ride for a plurality of passengers, comprising:
    a motion platform supported by a plurality of actuators, wherein the plurality of actuators are configured to provide motion to the motion platform;
    a plurality of passenger seats mounted upon the motion platform,
    wherein each passenger seat of the plurality of passenger seats comprises a plurality of passenger seat actuators;
    a plurality of passenger head-mounted displays; and
    a ride model programmed to:
        control the plurality of actuators in accordance with the ride model based on input received from a first passenger of the plurality of passengers;
        control the plurality of passenger seat actuators wherein at least one of the passenger seat actuators is configured to provide motion to a second passenger's seat based on input from a second passenger; and
        communicate information regarding progress of the ride to each of the passenger head-mounted displays,
    wherein each of the passenger head-mounted displays combine the information regarding progress of the ride with passenger gaze information to display a personalized viewpoint for each passenger of the plurality of passengers.

2. The system of claim 1,
    wherein progress of the ride is at least partially controlled by a passenger of the plurality of passengers using one or more ride controls,
    wherein the motion platform moves three-dimensionally in accordance with the ride controls and the ride model,
    wherein the three-dimensional movement is presented in the plurality of passenger head-mounted displays.

3. The system of claim 1, wherein each passenger seat of the plurality of passenger seats includes a rumble unit configured to rumble based at least in part on the position of each passenger on the motion platform.

4. The system of claim 1, wherein the motion platform is further supported by a turntable enabling rotation.

5. The system of claim 1, wherein the motion platform is mobile.

6. The system of claim 5, wherein the motion platform is mounted inside a vehicle.

7. The system of claim 5,
    wherein the motion platform traverses a track, and
    wherein the motion platform is further supported by a turntable enabling rotation.

8. The system of claim 1,
    wherein the ride model further controls the plurality of actuators in accordance with a motion of a vehicle,
    wherein the vehicle is operated by a person distinct from the plurality of passengers.

9. A system for providing a motion-synchronized virtual-reality ride for a plurality of passengers, comprising:
    a plurality of motion platforms, each platform supported by a plurality of actuators,
    wherein each motion platform of the plurality of motion platforms comprises at least one seat mounted thereon;
    a plurality of passenger head-mounted displays; and
    a ride model programmed to:
        control the plurality of actuators for each of the plurality of motion platforms in accordance with the ride model,
        wherein each of the plurality of motion platforms is controlled independently by input received from at least one passenger of the plurality of passengers;
        control a set of actuators configured to provide motion to the at least one seat mounted on each of the motion platforms based on input from at least one passenger of the plurality of passengers; and
        communicate information regarding progress of the ride to the plurality of passenger head-mounted displays, wherein information regarding progress of the ride is based at least in part on the input received from the plurality of motion platforms and is combined into one virtual reality environment, wherein each of the plurality of passenger head-mounted displays combine the information regarding the progress of the ride with passenger gaze information to display a personalized viewpoint for each passenger of the plurality of passengers.

10. The system of claim 9, further comprising at least one user input device for controlling the progress of the ride.

11. The system of claim 10,
wherein the ride model is further programmed to control the plurality of actuators for the plurality of motion platforms in accordance with input from the user input device, and
wherein the at least one seat is mounted on an additional plurality of actuators controlled by the user input and the ride model.

12. The system of claim 9, wherein at least one virtual user input is provided via the plurality of passenger head-mounted displays.

13. The system of claim 9, wherein each of the plurality of motion platforms is mobile.

14. The system of claim 9, wherein the ride model is further programmed to:
receive information indicative of a state of a vehicle; and
control the plurality of motion platforms in accordance with the information indicative of the state of the vehicle and the ride model,
wherein the ride model is indicative of a set of characteristics associated with the vehicle.

15. A system for providing a motion-synchronized virtual-reality ride for at least one passenger, comprising:
at least one motion platform supported by a plurality of actuators,
wherein the at least one motion platform comprises at least one seat;
at least one passenger head-mounted display;
at least one ride control configured for a user input; and
a ride model programmed to:
receive information indicative of a state of a drone,
wherein the information indicative of the state of the drone is telemetry data gathered from sensors associated with the drone,
wherein the motion of the drone is controlled at least in part by the user input;
control the plurality of actuators in accordance with the ride model and the ride control,
wherein the ride model includes a set of characteristics associated with the drone;
control the at least one motion platform in accordance with the information indicative of the state of the drone, the ride model, and the user input; and
communicate information regarding progress of the ride to the at least one passenger head-mounted display,
wherein the at least one passenger head-mounted display combines the information regarding the progress of the ride with passenger gaze information to display a personalized viewpoint for the at least one passenger.

16. The system of claim 15, wherein the at least one motion platform is mobile.

17. The system of claim 15,
wherein a representation of the at least one motion platform is depicted via the at least one passenger head-mounted display,
wherein the at least one motion platform communicates with the at least one passenger head-mounted display wirelessly through a central processor.

18. The system of claim 17, wherein the at least one passenger head-mounted display displays information associated with a first motion platform to a second passenger that is on a second motion platform.

19. The system of claim 18, wherein the at least one passenger head-mounted display displays information related to an input from a second passenger that is on the second motion platform.

20. The system of claim 15, wherein the drone is an unmanned aerial vehicle.

* * * * *